(12) United States Patent
Harper et al.

(10) Patent No.: US 6,757,276 B1
(45) Date of Patent: Jun. 29, 2004

(54) TOUCH TONE REPLACEMENT FOR INTERNET TELEPHONY

(76) Inventors: Matthew Harper, 4126 N. Yale, Arlington Heights, IL (US) 60004; Richard J. Dynarski, 3 S. 131 Sequoia Dr., Glen Ellyn, IL (US) 60137; Timothy G. Mortsolf, 5750 Abbey Dr. #3N, Lisle, IL (US) 60532; Kenneth L. Peirce, Jr., 21301 N. Woodland Ave., Barrington, IL (US) 60010

( * ) Notice: Subject to any disclaimer, the term of this patent is extended or adjusted under 35 U.S.C. 154(b) by 0 days.

(21) Appl. No.: 09/198,827

(22) Filed: Nov. 24, 1998

(51) Int. Cl.[7] ............................. H04L 12/64; H04L 12/66
(52) U.S. Cl. ..................... 370/356; 370/352; 370/353; 370/466; 341/126; 341/144; 341/155; 341/177; 341/181; 375/254; 375/334; 379/339
(58) Field of Search ........................... 341/54, 94, 126, 341/144, 155, 177, 181; 370/310, 315, 345, 347, 351, 352, 353, 356, 465, 466; 375/242, 254, 334, 335; 379/338, 339, 341, 900

(56) References Cited

U.S. PATENT DOCUMENTS

| | | | | |
|---|---|---|---|---|
| 3,772,596 A | * | 11/1973 | Edwards | 325/13 |
| 3,899,642 A | * | 8/1975 | Jones et al. | 179/18 J |
| 4,156,229 A | * | 5/1979 | Shawhan | 340/18 P |
| 4,479,092 A | * | 10/1984 | Falconer | 329/145 |
| 5,353,346 A | * | 10/1994 | Cox et al. | 379/386 |
| 5,400,365 A | * | 3/1995 | Tulai | 375/88 |
| 5,410,594 A | * | 4/1995 | Maruyama | 379/398 |
| 5,426,696 A | * | 6/1995 | Zimbrek | 379/386 |
| 5,436,590 A | * | 7/1995 | Simard et al. | 329/303 |
| 5,438,614 A | | 8/1995 | Rozman et al. | |
| 5,528,595 A | | 6/1996 | Walsh et al. | |
| 5,528,663 A | * | 6/1996 | Locke et al. | 379/31 |
| 5,577,105 A | | 11/1996 | Baum et al. | |
| 5,694,466 A | * | 12/1997 | Xie et al. | 379/386 |
| 6,067,381 A | * | 5/2000 | Benayoun et al. | 382/232 |
| 6,115,616 A | * | 9/2000 | Halperin et al. | 455/557 |
| 6,259,691 B1 | | 7/2001 | Naudus | 370/352 |

* cited by examiner

*Primary Examiner*—Hassan Kizou
*Assistant Examiner*—Joe Logsdon
(74) *Attorney, Agent, or Firm*—McDonnell Boehnen Hulbert & Berghoff

(57) ABSTRACT

Tones that are generated by a telephone or PC (such as DTMF tones) and subject to loss or noise during generation or during transmission along a medium are detected and replaced with substantially noise-free and distortionless digital signals. In one embodiment, the replacement of the tones is done in a modem embodied in an Internet telephony Gateway/Terminal, such as in a network access server coupling a time division multiplexed telephone line to a packet-switched network. The replacement of the tones may also be performed in any suitable device that provides an interface between a time division multiplexed transmission medium and a packet switched data network, such as in the modems of a cellular telephone network to Internet network access server.

18 Claims, 3 Drawing Sheets

TOUCH TONE REPLACEMENT FOR INTERNET TELEPHONY

BACKGROUND OF THE INVENTION

A. Field of the Invention

This invention relates generally to the field of telecommunications, and more particularly to methods by which telephone calls (either via a personal computer or conventional "black telephone" set) are placed between two parties over a data network such as the Internet.

B. Description of Related Art

Internet telephony presents an attractive alternative for long distance telephone calls, as compared to the public switched telephone network (PSTN), which has been the traditional transmission medium. The primary advantage is cost. Long distance service providers for the PSTN offer domestic services at rates ranging from roughly 10 to 30 cents per minute, and international rates for substantially more, depending on the time of day, day of the week, and the distances involved. In contrast, the cost of Internet telephony anywhere in the world is potentially the cost of a local telephone call to the local Internet telephony provider at one end and the cost of a local call from an Internet telephony service provider at the far end to the destination telephone. Once the call is routed from the local Internet telephony provider onto the Internet, the transmission of the call from the local Internet telephony provider to the far end Internet telephony provider is free to the calling and called party for all practical purposes, regardless of where the two parties are located. The same holds true for whether the call is sent over the Internet or over a private data network.

It is presently contemplated that Internet service providers with a Point of Presence on the Internet will be suitable entities to offer Internet telephony services. The devices that are used by most Internet service providers for Internet access are known as Network Access Servers or Remote Access Servers. These products are commercially available from 3Com Corporation and other telecommunications equipment manufacturers such as Ascend Communications, Lucent Technologies (successor to Livingston Enterprises), and Multitech.

A representative Network Access Server is the Total Control Enterprise Network Hub from 3Com Corporation, described in the patent of Dale M. Walsh, et al., U.S. Pat. No. 5,528,595, which is fully incorporated by reference herein. This device has a telephone line interface that is connected to a high-speed multiplexed digital telephone line connected to the PSTN, such as a T1 line. The device further includes a plurality of digital modems to perform signal conversions on the data from the telephone line channels and a bus network connecting the modems to a network interface card or module. The network interface couples the device to a local or wide area network, such as the Internet service provider backbone network or the Internet. Network Access Servers are particularly suited for use in Internet telephony, as they can be configured with software to perform the functions of a Gateway or Terminal, as defined by the relevant ITU-T H.323 and H.225 specifications. This is particularly so if the device is configured with a general purpose computing platform (such as the EdgeServer card of the Total Control Network Access Server), as described in the pending patent application of William Verthein, Daniel L. Schoo and Todd Landry, U.S. Ser. No. 08/813,173, also incorporated by reference herein.

In a typical Internet telephony scenario, a user will attempt an Internet telephony call with either a touch tone telephone or else a personal computer equipped with a modem, microphone, speaker and a suitable commercially available telephone software package, such as Megaphone™. In either circumstance, the situation may arise in countless types of telephone calls in which the user has to enter alpha-numeric information with their telephone or PC. For example, when the user calls an automated system for processing bank or individual retirement account transactions, the system typically will prompt the user to enter digits on their telephone corresponding to their social security number, password number, and account number. As another example, the pressing of digits on the phone is often necessary in order to navigate through a voice mail menu system, or in order to use an automated flight arrival or departure system maintained by an airline, to name a few others.

When the user presses a number on the telephone key pad, e.g., "2", tone generation circuitry in the telephone (or PC) generates what are known as multifrequency tones. These tones are sometimes referred to as DTMF (Dual Tone MultiFrequency) tones. For example, the number "2" is represented by two tones having a frequency of 700 and 1100 Hz. Each digit from 0 to 9 has its own unique set of two tones. Additionally, the # key and the * key also have their own tones associated therewith. These tones are transmitted in-band (i.e., in the voice band) from the user to the far end for processing.

The present inventors have appreciated that the problem can arise in the transmission of telephone calls over a data network where the DTMF tone is subject to noise or distortion before it reaches the modem (or other device or system) coupling the telephone line to the data network. For example, a user may purchase an inexpensive telephone that has a poor quality DTMF tone generator, and use that telephone when dialing over a noisy or poor quality analog PSTN line. Furthermore, when the DTMF tones are transmitted to the modem linking the PSTN to the data network (e.g., the modems in a network access server acting as a Gateway/Terminal), the tones undergo lossy data compression and signal transformation processes before being placed on the data network. As a result, the devices on the network may have difficulty processing the data signals representing the DTMF tones, and in particular discriminating between one set of tones and other. The possibility may arise in which the tones associated with "1" are interpreted as the tones associated with "2". Or, the tones may simply not be recognized. Obviously, the occurrence of such an error would, at the very least, be extremely inconvenient to the user, and could be potentially very problematic. For example, mistakes could be made in the handling of the user's investment account, they could get the wrong flight times from the airlines, they would be unable to leave an important message or leave it with the wrong person, etc.

It is known in the art to detect DTMF tones in a modem, including a modem in a network access server. See the patent to Marc S. Baum, et al., U.S. Pat. No. 5,577,105, assigned to the assignee of the present invention. The Baum et al. '105 patent is hereby incorporated by reference herein. In the Baum et al. '105 patent, the DTMF tones are used by the network access server to perform various functions for an incoming call, such as quickly configure a modem to operate in a manner compatible with the transmission requirements of a remotely located modem, call up specific applications programs, or to route a call to a particular destination on a network. However, the potential for downstream mis-identification of the tones or difficulty in processing the tones, and the solution thereof provided by the present invention, is not recognized or appreciated in the above Baum et al. '105 patent, or other prior art known to the present inventors.

SUMMARY OF THE INVENTION

A method is provided for processing a touch tone (e.g., DTMF tones) subject to noise or distortion either during generation of the touch tone or during transmission of the touch tone from the source along a transmission medium, such as an analog telephone line or radio frequency cellular telephone link. In one embodiment, the method comprises the first step of receiving the tone, such as, by receiving the tone in a modem in a network access server or in some other device linking a telephone or time division multiplexed network to a packet switched network. After the tone is received, it is analyzed to determine what digit the tone corresponds to. For example, tone processing circuitry (e.g., a DSP) may determine that the tones are 700 and 1100 Hz, corresponding to the digit "2". The tones are then replaced and substituted with a pure, i.e., substantially noiseless and distortion-free, digital signal corresponding to the tone. Again, this can be performed with suitable digital signal processing circuitry in the modem or other device, such as by a DSP fetching a bit pattern corresponding to the digital signal from a memory, or by use of a digital tone generator circuit. Then, the substantially noiseless and distortion-free, digital signal corresponding to the tone is transmitted onto a data network for receipt by a device on the data network. The data network, such as the Internet, is typically a substantially noise-less transmission medium, so the device on the network receiving the digital replacement tone will have no difficulty detecting the digital signals corresponding to the tone, distinguishing one tone from another, and correlating the tone with the digit pressed at the other end. Thus, the shortcomings in the prior art are avoided.

In one possible embodiment of the invention, the device detecting the touch tones (such as in the modem coupling the PSTN to the data network) may perform additional steps of determining whether the noise or distortion of the tone is below a predetermined threshold level (i.e., the signal to noise ratio is above a predetermined threshold), and if the signal to noise ratio is below the predetermined threshold, responsively replacing the tone with a substantially noiseless and distortion-free digital signal corresponding to the tone. This embodiment would thus pass though relatively noiseless and distortion free tones. However, the simpler and most reliable implementation of the method, and thus the preferred approach, is to replace all detected touch tones with the pure noiseless and distortion-free digital signals corresponding to the detected tones.

In an embodiment of the invention in which the substitution of the tones is performed in a modem, additional processing of the tone may be performed. For example, the substitution of the tone with the replacement pure digital signal may be accompanied by compression and encoding of the substantially noise and distortion free digital signal corresponding to the DTMF tone. Although these will typically be lossy processes, the resulting compressed and encoded tones are still able to be reliably detected and discriminated by devices on the data network.

In another aspect of the invention, an improvement to a network access server is provided. The network access server comprises a telephone line interface coupling the network access server to a PSTN line, a modem, a network interface coupling the network access server to a data network, and a bus complex for connecting the telephone line network, modem and network interface to each other. The modem includes a digital signal processor and either a digital tone generator or a memory storing the bit pattern for digital tones corresponding to the DTMF tones for 0, 1, 2, 3, 4, 5, 6, 7, 8, 9, # and *. The digital signal processor detects a DTMF tone subject to loss or distortion present in a data stream from the PSTN line. Using either the tone generator or memory, the DSP responsively replaces the DTMF tone with a substantially noise-free and distortionless digital signal corresponding to the DTMF tone. The modem transmits the digital replacement signal to the network interface for placement on the data network. Accordingly, the reliability of detection and discrimination of the DTMF tone by a device in the network may be improved.

While one embodiment of the invention is described herein in the context of a network access server coupling a noise-prone PSTN line to a data network, it will be appreciated that the invention can be implemented in other environments where there is an interface between a network carrying tones subject to loss or distortion and a packet-switched network. For example, cellular telephone networks have aggressive voice compression algorithms to optimize bandwidth utilization, and loss-prone radio frequency links, hence the potential for distortion and resulting undetectability of DTMF tones at the far end is pronounced. The method of the invention can be utilized in cellular telephone switches (or conceivably elsewhere in a cellular telephone network) where there is an interface between a time division multiplexed transmission medium carrying cellular phone data and a packet switched network such as the Internet. In one possible embodiment, the invention could be implemented in a modem in a gateway for providing internet access for cellular telephone customers, such as in the modems of the network access server described in the pending patent application of Yingchun Xu, et al., U.S. Ser. No. 08/887,313, assigned to the assignee of the present invention, which is incorporated by reference herein.

These and other features of the preferred and alternative embodiments of the invention will be more apparent from the following detailed description.

BRIEF DESCRIPTION OF THE DRAWINGS

Presently preferred forms of the invention are depicted in the drawings, where like reference numerals refer to like elements in the various figures, and wherein.

DETAILED DESCRIPTION OF THE PREFERRED AND ALTERNATIVE EMBODIMENTS OF THE INVENTION

Figure 1:
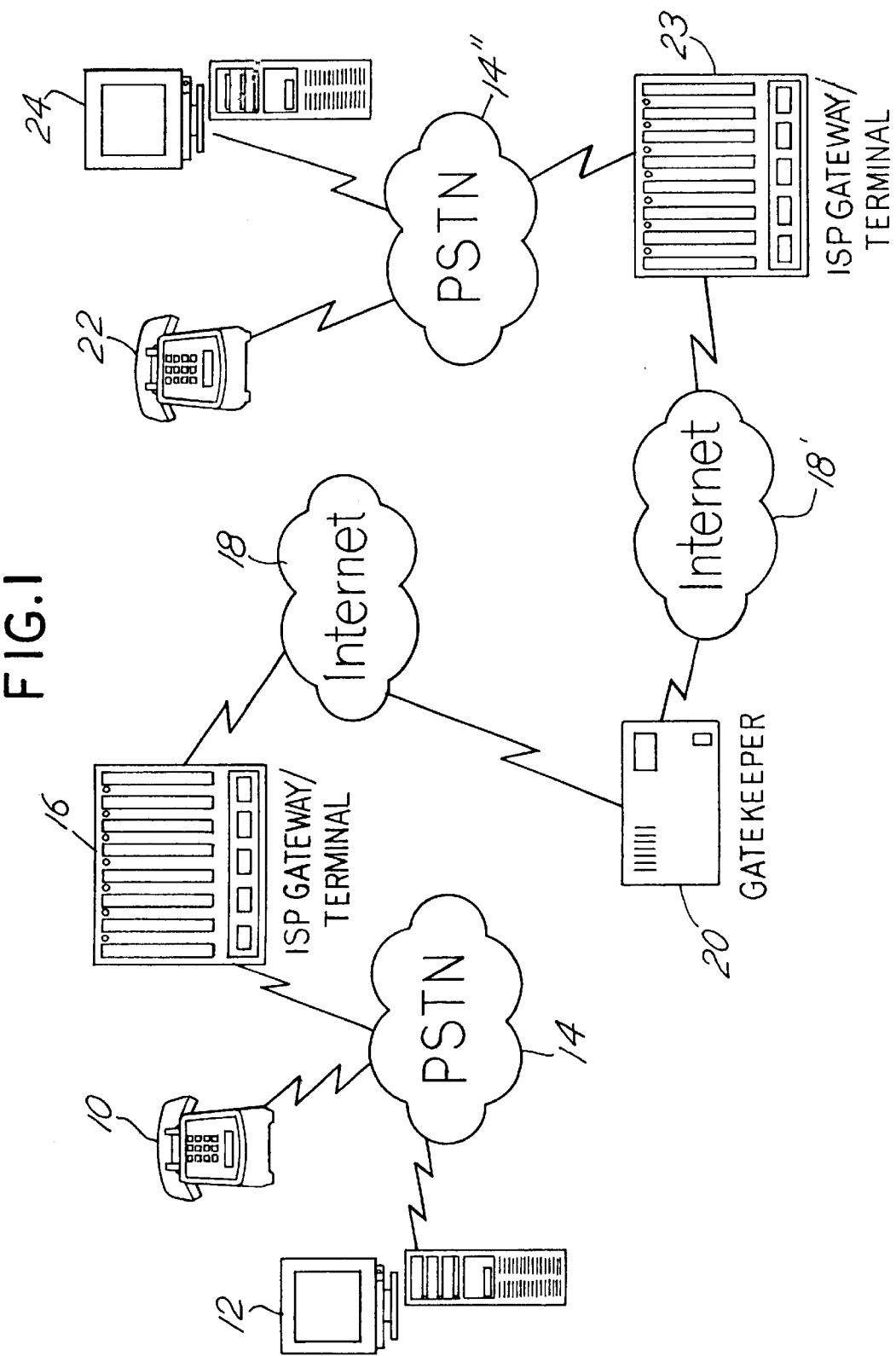
FIG. 1 is an illustration of a typical Internet telephony arrangement.

Referring now to FIG. 1, an arrangement of telecommunications devices that can be used to conduct an IP telephony call is illustrated schematically. An Internet telephony call can take place with the calling party either using a conventional telephone 10 or a personal computer 12 equipped with a modem, speaker and microphone and suitable commercially available telephone software program such as Megaphone™. In either case, the telephone 10 or PC 12 generates touch tones using known touch tone generation circuitry. The call is transmitted over a loss and/or noise-prone Public Switched Telephone Network (PSTN) line 14 (typically as a local call) to an Internet Service Provider (ISP) Gateway/Terminal 16. The ITU-T H.225 and H.323 specifications provide further details (not important here) concerning the functions of the Gateway/Terminal 16. The Gateway/Terminal may be implemented in a Network Access Server, as described in more detail below.

The Gateway/Terminal 16 provides an interface between the PSTN (typically a time division multiplexed line such as a Ti line) and a packet switched network such as the Internet or the local ISP backbone network. The Gateway/Terminal 16 routes the call onto the Internet 18, where it is forwarded to a Gatekeeper 20 in accordance with the H.323 and H.225 standards. The Gatekeeper 20 may be embodied as a general purpose computer, or as one function performed by an existing piece of telecommunications equipment such as a network access server. The Gatekeeper 20 determines where to send the call over the Internet 18' to the proper terminating ISP Gateway/Terminal 23 for the called party. The terminating Gateway/Terminal 23 calls the called party over the PSTN 14', either to a conventional telephone set 22 or to a PC 24, and facilitates communication between either the telephone 10 or computer 12 at the near end with the telephone 22 or computer 24 at the far end. In the present example, the correct identification and discrimination of the touch tones generated by the user at 10 or 12 may be needed by any variety of the devices on the network 18, such as Gatekeeper 20. It is also very important that the far end telephone 22 or computer 24 be able to reliably detect and identify the touch tones, particularly where the far end 24 is a voice mail system, a computer at a bank or other financial institution, or other situation where the usage of touch tones by the user is anticipated.

In accordance with one possible embodiment of the invention, a method is provided for processing a touch tone subject to noise or distortion either during generation of the touch tone by the telephone 10 or PC 12 (or otherwise), or during transmission of the touch tone along a telephone line, or any other communications medium which is subject to noise or distortion, such as the PSTN line 14.

The method comprises the steps of first receiving the tone from a line 14 in the public switched telephone network, such as by receiving the tone as part of the incoming data stream arriving in the Gateway/Terminal 16. Then, the tones are detected in the Gateway/Terminal 16. This is done by digital signal processors in the modems in the network access server comprising the Gateway/Terminal 16.

In one possible embodiment, the modems then determine whether the noise or distortion of the tone is below a predetermined threshold. The idea is that if the noise or distortion are below the threshold level, i.e., the signal to noise ratio is above a predetermined threshold, the tone does not need to be replaced and it will be reliably detected at the far end of the network or at the far end telephone or computer. If the signal to noise ratio is below the predetermined threshold, then the digital signal processor and any associated tone generation circuitry responsively replace the tone with a substantially noiseless and distortion-free digital signal corresponding to the tone.

In a more preferred embodiment, the determination of whether the noise or distortion are below a predetermined threshold is dispensed with, and the modem or other associated device simply replaces all received and detected touch tones with substantially noiseless and distortion-free digital signals. This relieves the modems of having to perform the task of determining the signal to noise ratio of the touch tones, determining whether the signal to noise ratio is high enough, and other time consuming and computationally intensive tasks.

In a typical implementation of the method (but not necessarily always), the modem in the Gateway/Terminal will then perform a compression and encoding of the substantially distortion free digital signal corresponding to the tone (along with the other data in the voice band). The modem then transmits the compressed and encoded signal in-band onto a data network (e.g., Internet 18) for receipt and processing by either a device on the network or ultimate end user, e.g., telephone 22 or PC 24. Note that as the tones for the touch tones are universal standards, the DSP's in the modems may be designed such that they have access to a perfect digitized tone signal stored in a suitable memory. The perfect tone is always ready for substitution into the packetized data stream.

Figure 2:
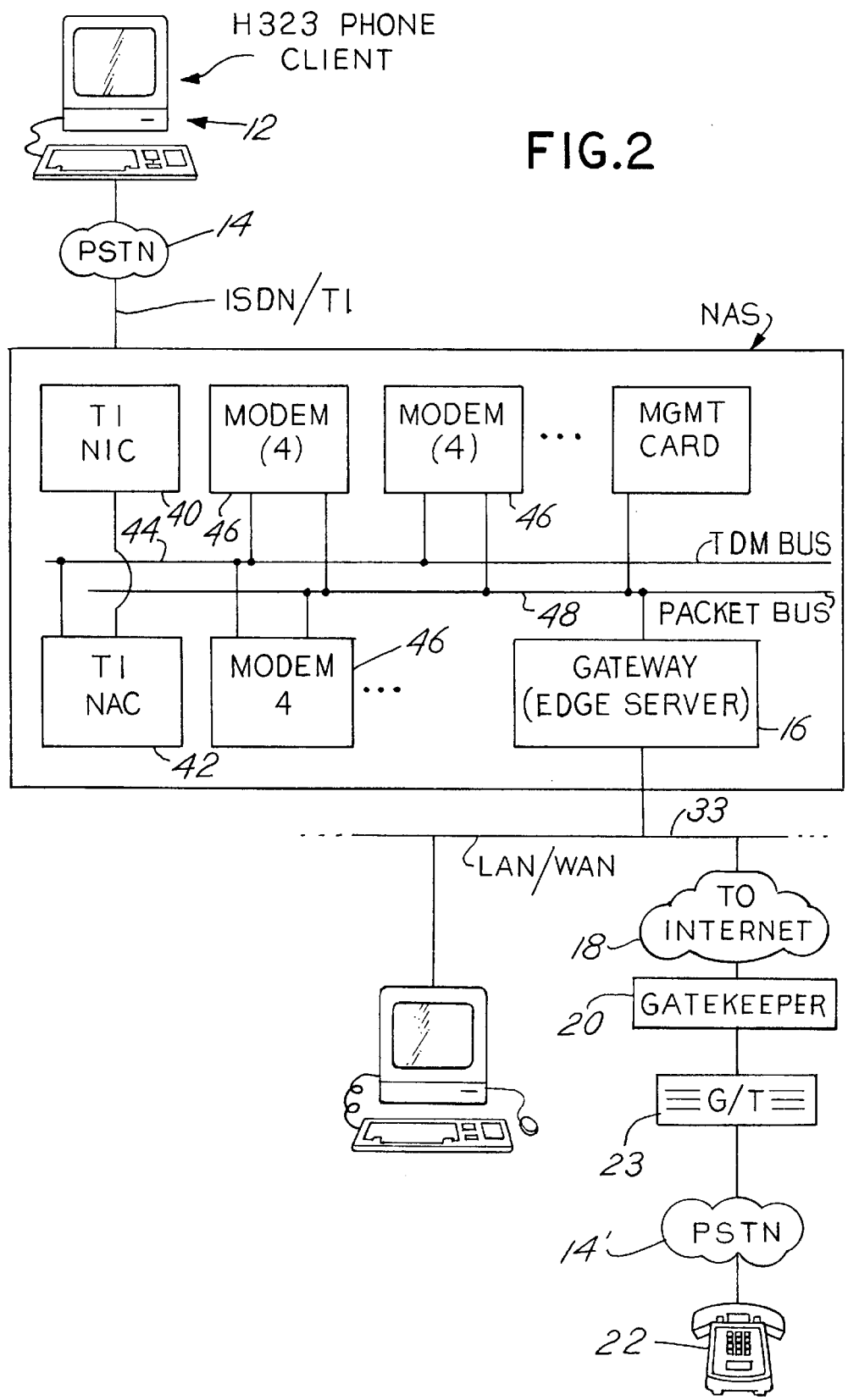
FIG. 2 is an illustration of a Network Access Server that is configured with software to perform the functions of an Internet telephony gateway of FIG. 1.

FIG. 2 is an illustration of an embodiment of the invention in the situation where the replacement of the tones takes places in the modems of a Network Access Server (NAS). The modems essentially provide an interface between a PSTN line and a packet switched data network, such as a private data network, an ISP backbone network or a wide area network such as the Internet. The network access server NAS is configured with software to perform the functions of an Internet telephony gateway.

In FIG. 2, the NAS receives incoming calls from H.323 phone clients from the PSTN along a multiplexed digital telephone line, such as a 24 channel T1 line or an ISDN primary rate interface consisting of 23 bearer channels (B channels) and 1 control channel (D channel). The incoming voice data is received in the NAS by a T1 network interface card 40, which cooperates with a T1 network application card 42 to demultiplex the 24 channels in the T1 line and place the 24 channels of data into 24 different time slots of a time division muliplexed bus 44. Four of the time slots on the TDM bus are assigned to a modem card 46, each comprising four digital modems and associated memory, processing and interface circuits. There are 6 modem cards for a total of 24 modems per one T1 line. Of course, the basic architecture of the NAS of FIG. 2 can be scaled to higher numbers of ports, such as in current high density versions of a network access server commercially available from 3Com and other companies.

The modems perform required signal transformations on the coded digital data received from the T1 line via TDM bus and output data in digital form useful by a general purpose computer on a packet, cell or other suitable bus 48. Each modem card 44 shares the packet bus 48. The data from the modems, in packet form, is passed to a Gateway or network interface card, which in the embodiment of FIG. 2, comprises a general purpose computing platform. This card is described in more detail in the patent application of William Verthein, et al., U.S. Ser. No. 08/813,173, which is fully incorporated by reference herein. The Gateway or network interface card of FIG. 2 is given the reference numeral 16 in the drawing because the card performs, among other things, the functions of an H.323 Gateway/Terminal for the modems in the NAS in accordance with the H.323 specification, in addition to TCP/IP or IPX protocol processing for required network protocols to interface with the LAN/Wan 33, suitable buffering between the NAS and the network 33, and other functions. The processing of some network protocols (such as the Point-To-Point Protocol and Real time Transport Protocol (RTP)) may be shared between the Gateway card 16 and the computing platforms in the modems of the modem cards 46, in the manner described in the patent application of Daniel L. Schoo et al., U.S. Ser. No. 08/970,834, which is also fully incorporated by reference herein.

The NAS may also contain a suitable network management card to manage the status of the modems and other cards in the unit, as described in U.S. Pat. No. 5,438,614 to Christopher Rozman, et al.

Further details on the overall architecture and operation of the several modules of the network access server NAS of FIG. 2 are known in the art and described in the patent literature, and therefore will be omitted from this document for the sake of brevity. The interested reader is directed to, inter alia, the patent of Dale M. Walsh, et al., U.S. Pat. No. 5,528,595 and Marc S. Baum, et al., U.S. Pat. No. 5,577,105, both of which are assigned to the assignee of the present invention. Both of these patents are also fully incorporated by reference herein.

Figure 3:
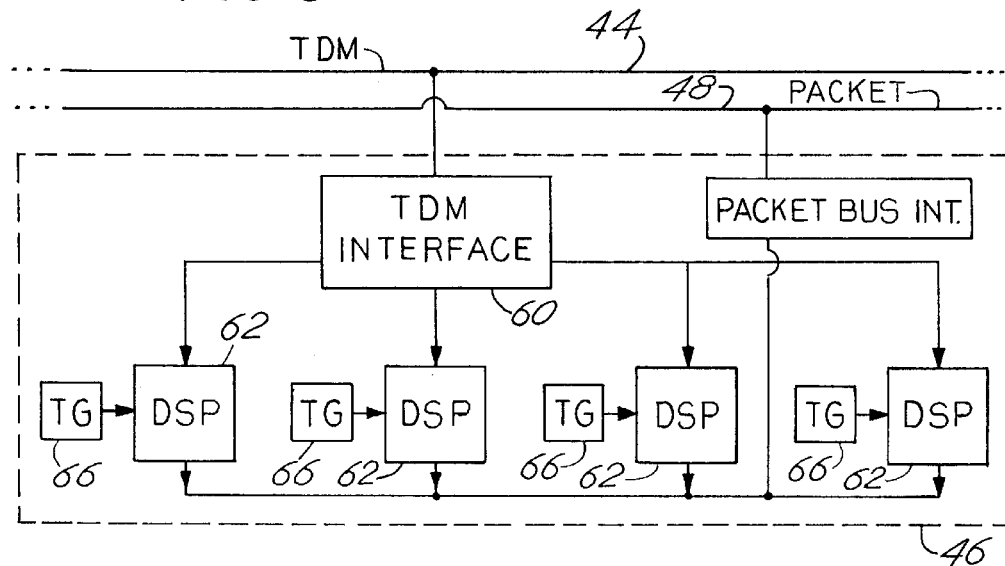
FIG. 3 is a more detailed illustration of the modem module of FIG. 2.

FIG. 3 is a more detailed schematic block diagram of the modem module of FIG. 2. The diagram is somewhat simplified to eliminate extraneous details not necessary to the present invention, with such details already set forth in the patent literature cited herein. Each modem module includes a TDM interface 60 that retrieves four time slots of T1 channel data from the TDM bus 44, and directs the data from one time slot to one digital signal processor (DSP) engine 62 that performs various known digital modem functions. Four such DSP engines 62 are provided in the representative quad modem card 44, each DSP performing the functions of one digital modem. Other designs are possible. For example, it is possible to implement two modems in a single DSP engine 62 in the manner described in the above-referenced patent application of Daniel L. Schoo, et al., U.S. Ser. No. 08/970,834.

The functions performed in the DSP engines include, among other things, detection of DTMF tones in the incoming data stream. Details on the detection of DTMF tones in a network access server modem are described in the above-referenced patent of Marc S. Baum et al, U.S. Pat. No. 5,577,105. When the modem DSPs 62 detect the DTMF tones, they can either perform a calculation of the signal to noise ratio to determine whether the tones should be replaced with a substantially noise-free and distortionless digital version of the tones, or, more preferably, the DSPs 62 simply replace the tones. One way of performing the replacement of the tones is to use a tone generator circuit 66 to supply the digital signal corresponding to the DTMF tones to the DSP 62. Alternatively, the digital bit pattern corresponding each of the tones could be stored in a read-only memory in communication with the DSPs 62, and when the tones are detected in the incoming data stream the DSPs fetch the digital bit patterns from the memory and insert them into the data stream.

After the DTMF tones have been replaced, the modem DSPs will typically thereafter perform a compression and encoding algorithm to convert the incoming data stream (which at this point is not in a digital form useful to a general purpose computer) into a digital form which is useful to a general purpose computer. The data from the DSPs is then supplied to a packet bus interface module 68, which then coordinates the placement of the data on the packet bus 48 for transmission to the gateway card 16 of FIG. 2 and onto the network 33 or Internet 18 for transmission to the far end as described above.

Figure 4:
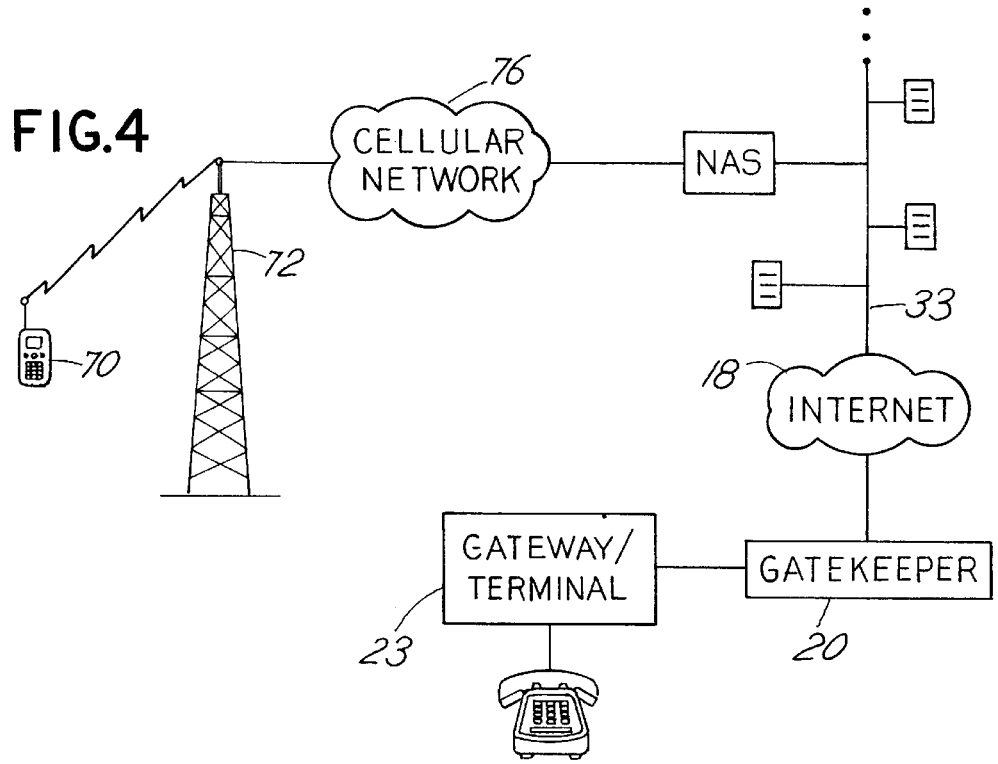
FIG. 4 is a schematic illustration of the implementation of the invention in a cellular telephone network.

FIG. 4 is a schematic illustration of the implementation of the invention in a cellular telephone network. In FIG. 4, a cellular telephone 70 is used to make an Internet telephony call to a person operating telephone 22. The cellular phone 70 transmits touch tones through the air (a transmission medium medium subject to noise and distortion) to a cellular telephone tower 72. The cellular telephone tower 72 includes circuitry to multiplex the call onto a cellular telephone network 76. The cellular telephone network 76 interfaces with a packet-switched data network via a network access server NAS (which may function as a initiating Gateway/Terminal). The data network in the present example comprises the Internet 18, which includes a Gatekeeper 20, terminating Gateway/Terminal 23 and phone 22. In the embodiment of FIG. 4, the replacement of DTMF tones occurs in the DSP system implementing modem functions (or the digital equivalent) in the network access server NAS.

Presently preferred and alternative embodiments of the invention have been described with particularity. Persons of skill in the art will appreciate that considerable variation in the specifics of the implementation of the invention from the disclosed embodiments can be used, without departure from the spirit and intended scope of the invention. Examples of such variations include the manner in which the DSP engines in a modem perform the substitution of the DTMF tones, the manner in which the tones are detected, the particular architecture or construction of the Gateway/Terminal or network access server, and the details of the modem modules in a network access server, all of which are not considered of critical importance. Such variations are considered equivalent to the disclosed embodiments. This true scope and spirit of the invention is to be arrived at by reference to the appended claims, to be interpreted in light of the foregoing specification and observations regarding equivalent implementations.

We claim:

1. A method for processing a touch tone subject to noise or distortion either during generation of said touch tone or during transmission of said touch tone along a transmission medium, comprising the steps of:
 (a) receiving said tone from said transmission medium;
 (b) detecting said tone;
 (c) determining whether the signal to noise ratio of said tone is below a predetermined threshold;
 (d) if said signal to noise ratio of said tone is below said predetermined threshold, responsively replacing said tone with a substantially noiseless and distortion-free digital signal corresponding to said tone;
 (e) performing compression and encoding of said substantially distortion free digital signal corresponding to said tone; and
 (f) transmitting said compressed and encoded signal onto a data network for receipt by a device on said data network or an ultimate recipient of said tones;

whereby said device on said network or said ultimate recipient receiving said compressed and encoded signal may reliably detect said signal and convert said signal into said touch tone.

2. The method of claim 1, wherein said transmission medium comprises a public switched telephone network line and steps (a)–(d) are performed by a modem coupling a public switched telephone network line to a packet switched network.

3. The method of claim 2, wherein said modem is incorporated into a network access server.

4. The method of claim 2, wherein said modem is incorporated into a network access server implementing the function of a Gateway/Terminal for Internet telephony.

5. The method of claim 1, wherein said network comprises a packet-switched network.

6. The method of claim 1, wherein said network comprises a time division multiplexed network.

7. The method of claim 1, wherein said network comprises a cellular telephone network.

8. A method for processing a touch tone subject to noise or distortion either during generation of said touch tone or during transmission of said touch tone along a transmission medium, comprising the steps of:

(a) receiving said tone from said transmission medium;

(b) detecting said tone;

(c) replacing said tone with a substantially noiseless and distortion-free digital signal corresponding to said tone;

(d) performing compression and encoding of said substantially distortion free signal corresponding to said tone; and (e) transmitting said compressed and encoded signal onto a data network for receipt by a device on said data network or the ultimate recipient of said tone;

wherein said method is performed in a network access server that implements the function of a Gateway/Terminal for Internet telephony;

whereby said device on said network or said ultimate recipient receiving said compressed and encoded signal may reliably detect said signal and convert said signal into said touch tone.

9. The method of claim 8, wherein said transmission medium comprises a public switched telephone network line, and wherein steps (a)–(d) are performed by a modem in said network access server interfacing between said public switched telephone network line and a packet switched network.

10. The method of claim 9, wherein said modem is incorporated into a network access server.

11. The method of claim 8, wherein said network comprises a packet-switched network.

12. The method of claim 8, wherein said transmission medium comprises a time division multiplexed network.

13. The method of claim 8, wherein said transmission medium comprises a cellular telephone network.

14. A method for processing a touch tone subject to noise or distortion either during generation of said touch tone or during transmission of said touch tone along a transmission medium, comprising the steps of:

a) receiving said tone;

b) detecting said tone;

c) replacing said tone with a substantially noiseless and distortion-free digital signal corresponding to said tone; and d) transmitting said digital signal onto a data network for receipt by a device on said data network or by an ultimate recipient of said tone;

wherein said data network comprises a packet-switched network and wherein said method is performed in a network access server that implements the function of an Gateway/Terminal for Internet Telephony, said network access server interfacing between a time division multiplexed network and said packet-switched network;

whereby said device on said network or said ultimate recipient receiving said digital signal may reliably detect said signal and convert said signal into said tone.

15. In a network access server comprising a telephone line interface coupling said network access server to a telephone line, a modem, a network interface coupling said network access server to a data network, and a bus complex for connecting said telephone line interface, modem and network interface to each other, the improvement comprising:

said modem comprising a digital signal processor detecting a touch tone subject to loss or distortion present in a data stream from said telephone line, and wherein said digital signal processor responsively replaces said touch tone with a digital tone corresponding to said touch tone, said modem transmitting said digital tone to said network interface for placement on said data network, whereby the reliability of detection of said touch tone by a device in said network or an ultimate recipient of said touch tone may be improved.

16. The improvement of claim 15, wherein said modem further comprises a memory storing a bit pattern corresponding to said touch tone, said digital signal processor fetching said digital tone upon detection of said touch tone in said data stream and replacing said touch tone with said digital tone.

17. The improvement of claim 15, wherein said network access server is coupled between a time division multiplexed digital transmission medium and a packet-switched data network.

18. The improvement of claim 15, wherein said network access server is configured as an Internet telephony Gateway/Terminal.

* * * * *

UNITED STATES PATENT AND TRADEMARK OFFICE
CERTIFICATE OF CORRECTION

PATENT NO. : 6,757,276 B1  Page 1 of 1
DATED : June 29, 2004
INVENTOR(S) : Matthew Harper et al.

It is certified that error appears in the above-identified patent and that said Letters Patent is hereby corrected as shown below:

Title page,
Item [73], Assignee, please add the Assignee -- 3Com Corporation, Santa Clara, California. --

Signed and Sealed this

Twenty-eighth Day of September, 2004

JON W. DUDAS
*Director of the United States Patent and Trademark Office*